United States Patent
Pritchard

(10) Patent No.: US 7,422,263 B2
(45) Date of Patent: Sep. 9, 2008

(54) LADDER ASSEMBLY FOR A TAILGATE OF A TRUCK

(76) Inventor: Wayne H. Pritchard, P.O. Box 709, Scurry, TX (US) 75158

( * ) Notice: Subject to any disclaimer, the term of this patent is extended or adjusted under 35 U.S.C. 154(b) by 0 days.

(21) Appl. No.: 11/621,017

(22) Filed: Jan. 8, 2007

(65) Prior Publication Data
US 2008/0106111 A1     May 8, 2008

Related U.S. Application Data

(60) Provisional application No. 60/864,599, filed on Nov. 6, 2006.

(51) Int. Cl.
*E06C 5/00* (2006.01)
(52) U.S. Cl. .................... 296/62; 280/166; 14/71.1
(58) Field of Classification Search .............. 296/61, 296/63; 14/71.1; 280/166; 182/127
See application file for complete search history.

(56) References Cited

U.S. PATENT DOCUMENTS

| | | | |
|---|---|---|---|
| 3,042,141 A * | 7/1962 | Hartman et al. ............... 182/95 |
| 3,853,369 A | 12/1974 | Holden | |
| 4,191,388 A | 3/1980 | Barksdale | |
| 4,405,141 A | 9/1983 | Jurek | |
| 4,571,144 A * | 2/1986 | Guidry et al. ............... 414/537 |
| 4,620,609 A | 11/1986 | Elsten | |
| 4,639,032 A * | 1/1987 | Barbour ..................... 296/62 |
| 4,757,876 A * | 7/1988 | Peacock ..................... 182/95 |
| 4,846,487 A * | 7/1989 | Criley ....................... 280/166 |
| 4,848,821 A | 7/1989 | Llewellyn | |
| 5,024,292 A | 6/1991 | Gilbreath et al. | |
| 5,028,063 A | 7/1991 | Andrews | |
| 5,133,584 A * | 7/1992 | McCleary ................... 296/61 |
| 5,205,603 A | 4/1993 | Burdette, Jr. | |
| 5,617,930 A | 4/1997 | Elia | |
| 5,803,475 A * | 9/1998 | Dick ......................... 280/163 |
| 5,941,342 A * | 8/1999 | Lee ........................... 182/95 |
| 6,116,378 A | 9/2000 | Barrow | |
| 6,120,081 A * | 9/2000 | Collins ....................... 296/61 |
| 6,270,139 B1 * | 8/2001 | Simpson ..................... 296/62 |
| 6,422,342 B1 * | 7/2002 | Armstrong et al. .......... 182/127 |
| 6,663,125 B1 * | 12/2003 | Cheng ....................... 280/166 |
| 6,772,721 B1 * | 8/2004 | Gardner et al. ........... 123/90.17 |
| 6,942,271 B1 * | 9/2005 | Jamison et al. ............... 296/61 |

(Continued)

OTHER PUBLICATIONS

The Thompson Companies, Hot Rolled Pickled and Oiled Steel, http://www.thomsponsteel.com/page124.html, (C) 2006.*

*Primary Examiner*—D. Glenn Dayoan
*Assistant Examiner*—Greg Blankenship
(74) *Attorney, Agent, or Firm*—Scott T. Griggs; Griggs Bergen LLP

(57) ABSTRACT

A ladder assembly is disclosed that mounts to a truck tailgate. In one embodiment, the ladder assembly includes a base which is coupled to the tailgate. A pair of legs are slidably and pivotably mounted to the based and each pair of legs includes three segments that define upper, middle, and lower ladder sections. A first pair of joints hingedly couples the upper ladder section to the middle ladder section. A second pair of joints hingedly couples the middle ladder section to the lower ladder section. The first pair of joints is larger than the second pair of joints such that when the upper ladder section is folded into the middle ladder section a pocket is formed therebetween for receiving the lower ladder section.

17 Claims, 7 Drawing Sheets

U.S. PATENT DOCUMENTS

| | | |
|---|---|---|
| 6,971,478 B2 | 12/2005 | Bareket |
| 6,994,184 B2 * | 2/2006 | Latimer et al. ................. 182/77 |
| 7,080,713 B1 * | 7/2006 | Riggs ......................... 182/127 |
| 2004/0140156 A1 * | 7/2004 | Moss et al. .............. 182/180.2 |
| 2004/0232649 A1 | 11/2004 | Lambie |
| 2005/0046219 A1 | 3/2005 | Livingston |
| 2005/0268434 A1 * | 12/2005 | Burbrink et al. .............. 16/324 |
| 2006/0151245 A1 * | 7/2006 | Patton ........................ 182/217 |

* cited by examiner

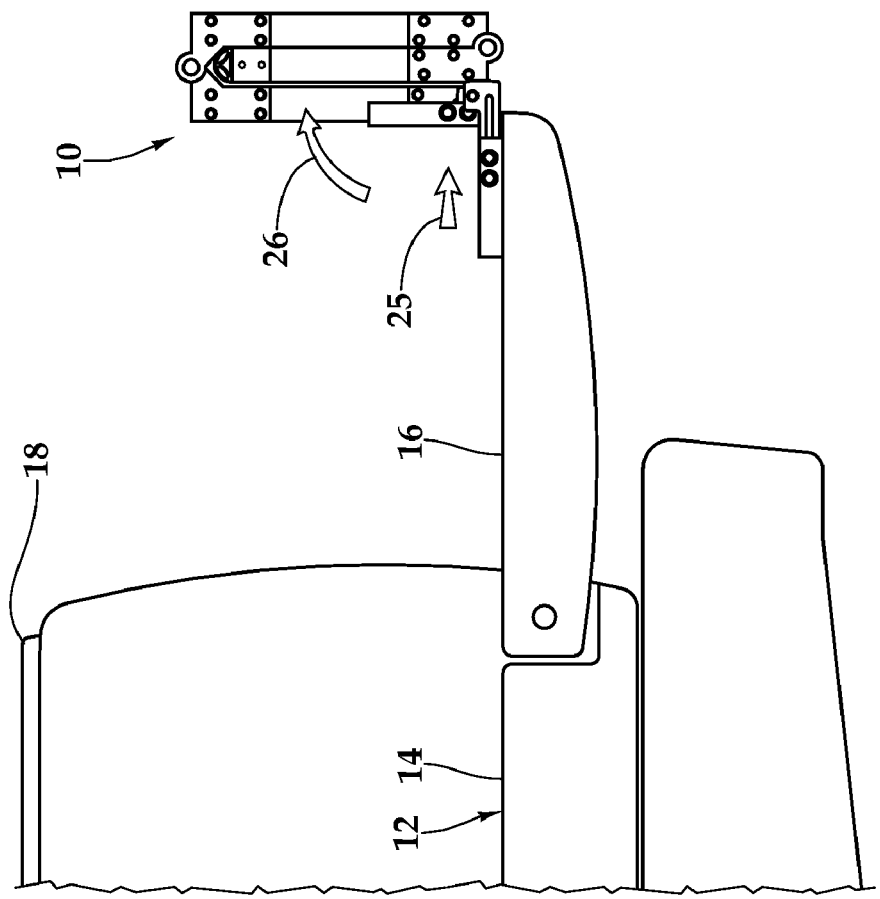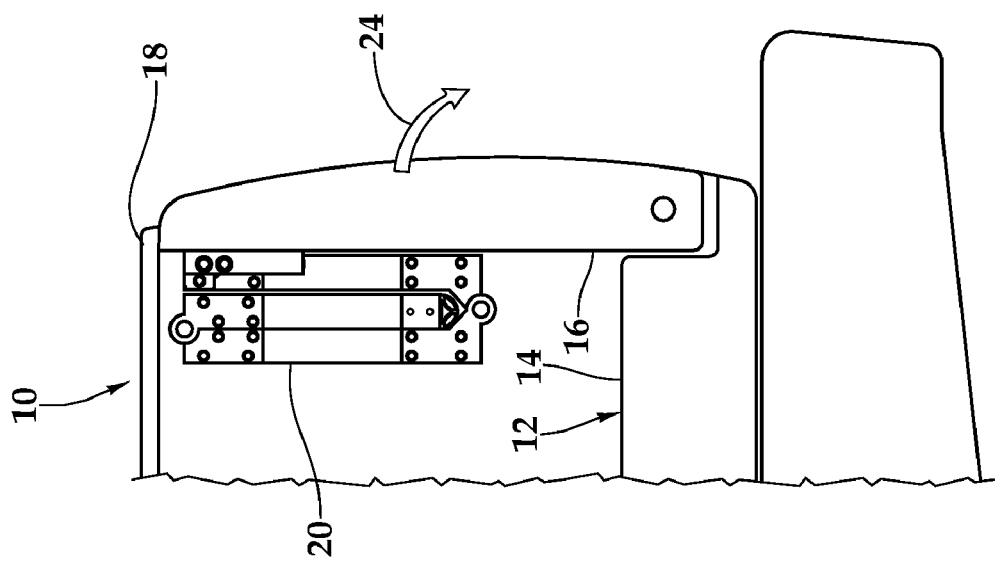

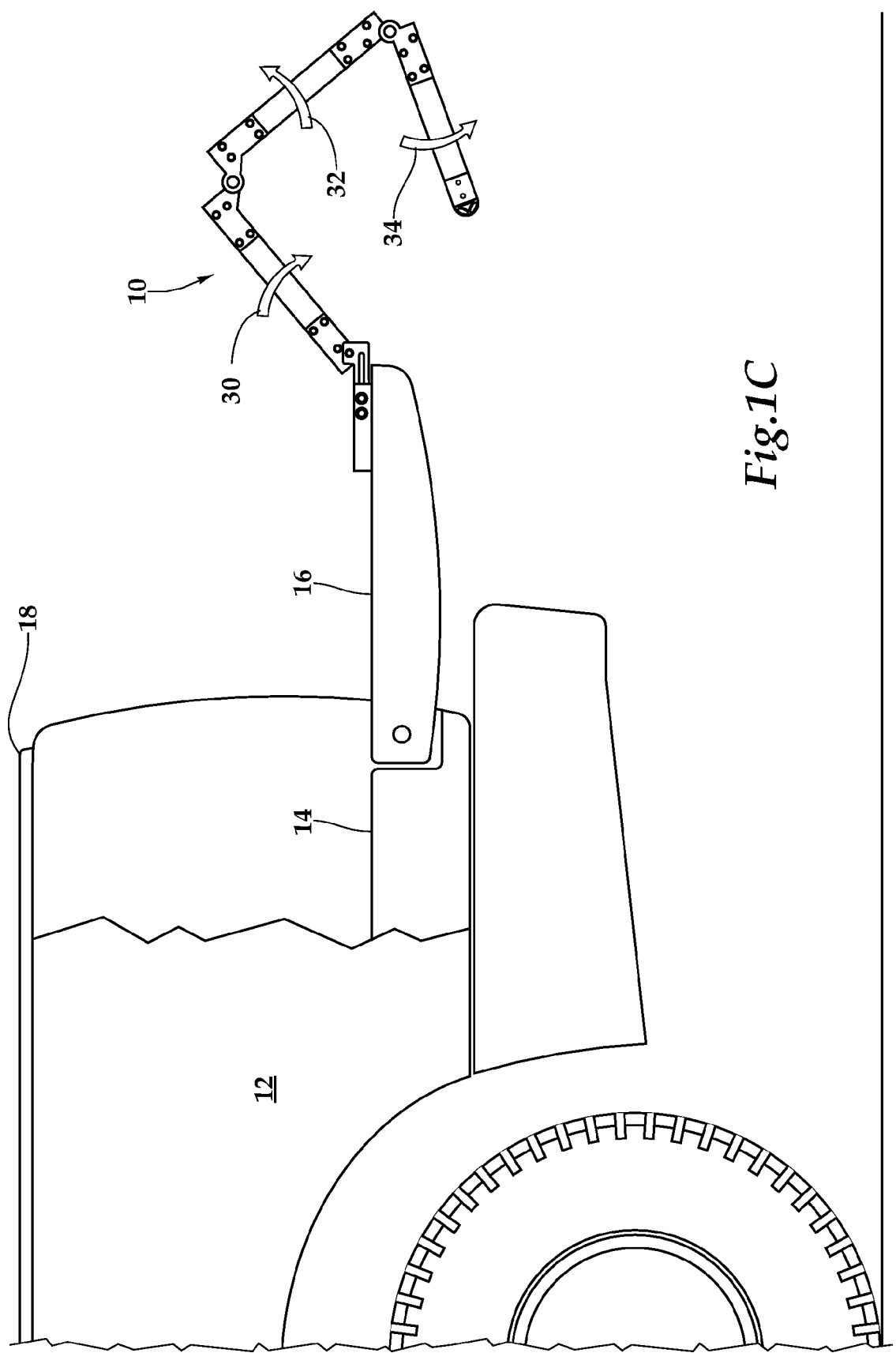

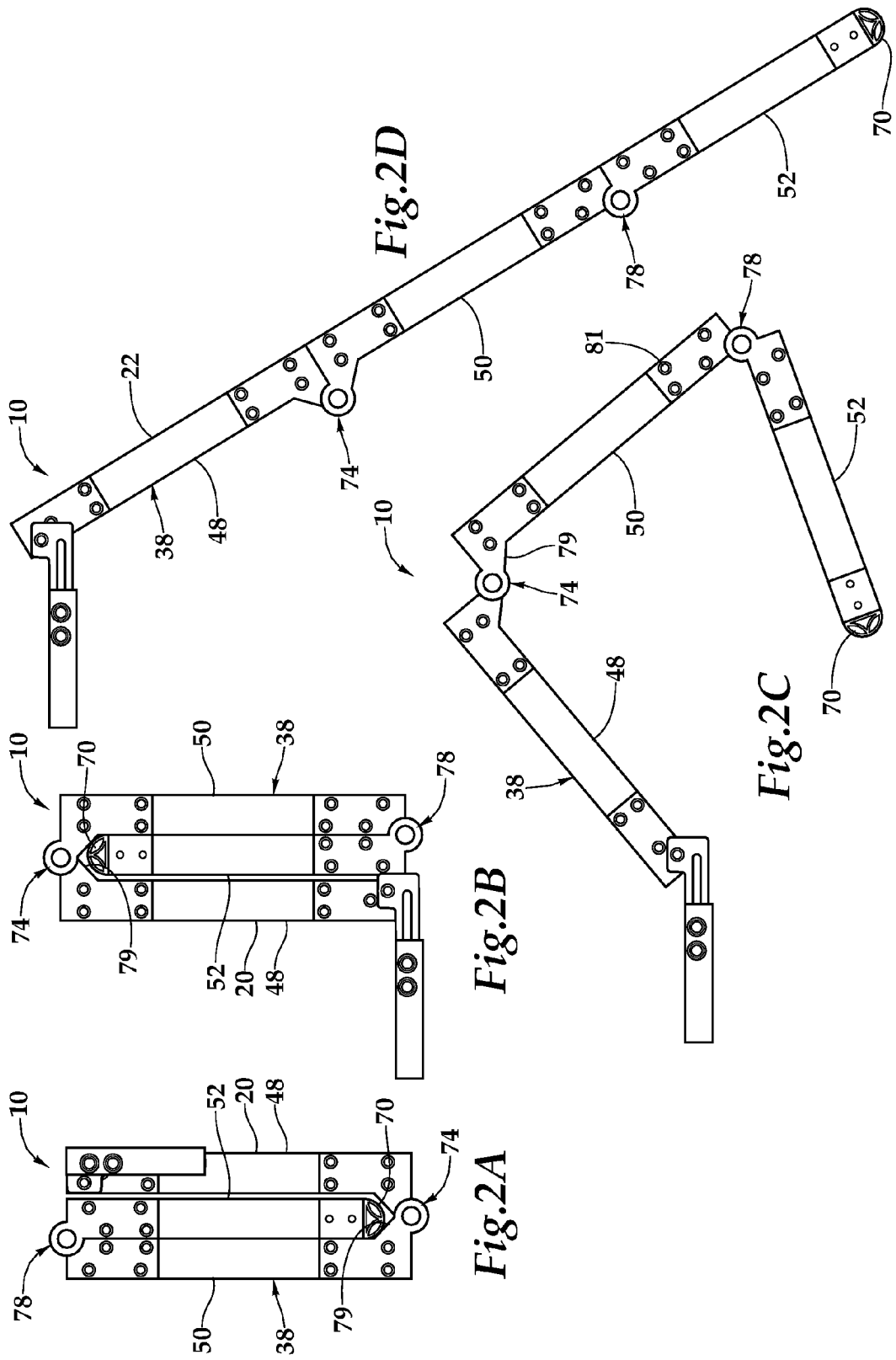

LADDER ASSEMBLY FOR A TAILGATE OF A TRUCK

PRIORITY STATEMENT & CROSS-REFERENCE TO RELATED APPLICATIONS

This application claims priority from co-pending U.S. Patent Application No. 60/864,599, entitled "Ladder Assembly for a Tailgate of a Truck" and filed on Nov. 6, 2006, in the name of Wayne H. Pritchard; which is hereby incorporated by reference for all purposes.

TECHNICAL FIELD OF THE INVENTION

This invention relates, in general, to foldable and storable step and ladder structures and, in particular, to a ladder assembly for a tailgate of a pickup truck that may be extended from the pickup truck bed of the pickup truck to the ground.

BACKGROUND OF THE INVENTION

Pickup trucks typically include a tailgate or end gate that, when opened, is 30 or more inches above the ground upon which the vehicle is parked. In many instances, it is difficult for an individual to climb into and out of the vehicle bed. Existing foldable and storable step structures for vehicles and, more specifically, pickup trucks are inadequate as they do not support enough weight and/or are too cumbersome when stored. In particular, many existing ladder assemblies do not provide clearance for bed covers and camper shells. Accordingly, a need exists for an improved ladder assembly for a tailgate of a truck.

SUMMARY OF THE INVENTION

A ladder assembly is disclosed that mounts to a truck tailgate. The ladder assembly is structurally sound and provides clearance for bed covers and camper shells. In one embodiment, the ladder assembly includes a base which is coupled to the tailgate. A pair of legs are slidably and pivotably mounted to the based and each pair of legs includes three segments that define upper, middle, and lower ladder sections. A first pair of joints hingedly couple the upper ladder section to the middle ladder section. A second pair of joints hingedly couple the middle ladder section to the lower ladder section. The first pair of joints are larger than the second pair of joints such that when the upper ladder section is folded into the middle ladder section a pocket is formed therebetween for receiving the lower ladder section.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1A is a side plan view, with a partial cutaway, of one embodiment of the ladder assembly of the present invention in a storage configuration wherein the ladder assembly is folded and mounted to a tailgate of a pickup truck having a pickup truck bed cover;

FIG. 1B is a side plan view, with a partial cutaway, of the ladder assembly presented in FIG. 1A wherein the ladder assembly is transitioning from the storage configuration to a working configuration;

FIG. 1C is a side plan view, with a partial cutaway, of the ladder assembly presented in FIG. 1A wherein the ladder assembly is continuing to transition from the storage configuration to the working configuration;

FIG. 2A is a side plan view providing an enlarged view of the ladder assembly as originally presented in FIG. 1A;

FIG. 2B is a side plan view providing an enlarged view of the ladder assembly as originally presented in FIG. 1B;

FIG. 2C is a side plan view providing an enlarged view of the ladder assembly as originally presented in FIG. 1C;

FIG. 2D is a side plan view providing an enlarged view of the ladder assembly as originally presented in FIG. 1D;

DETAILED DESCRIPTION OF THE INVENTION

Figure 1D:
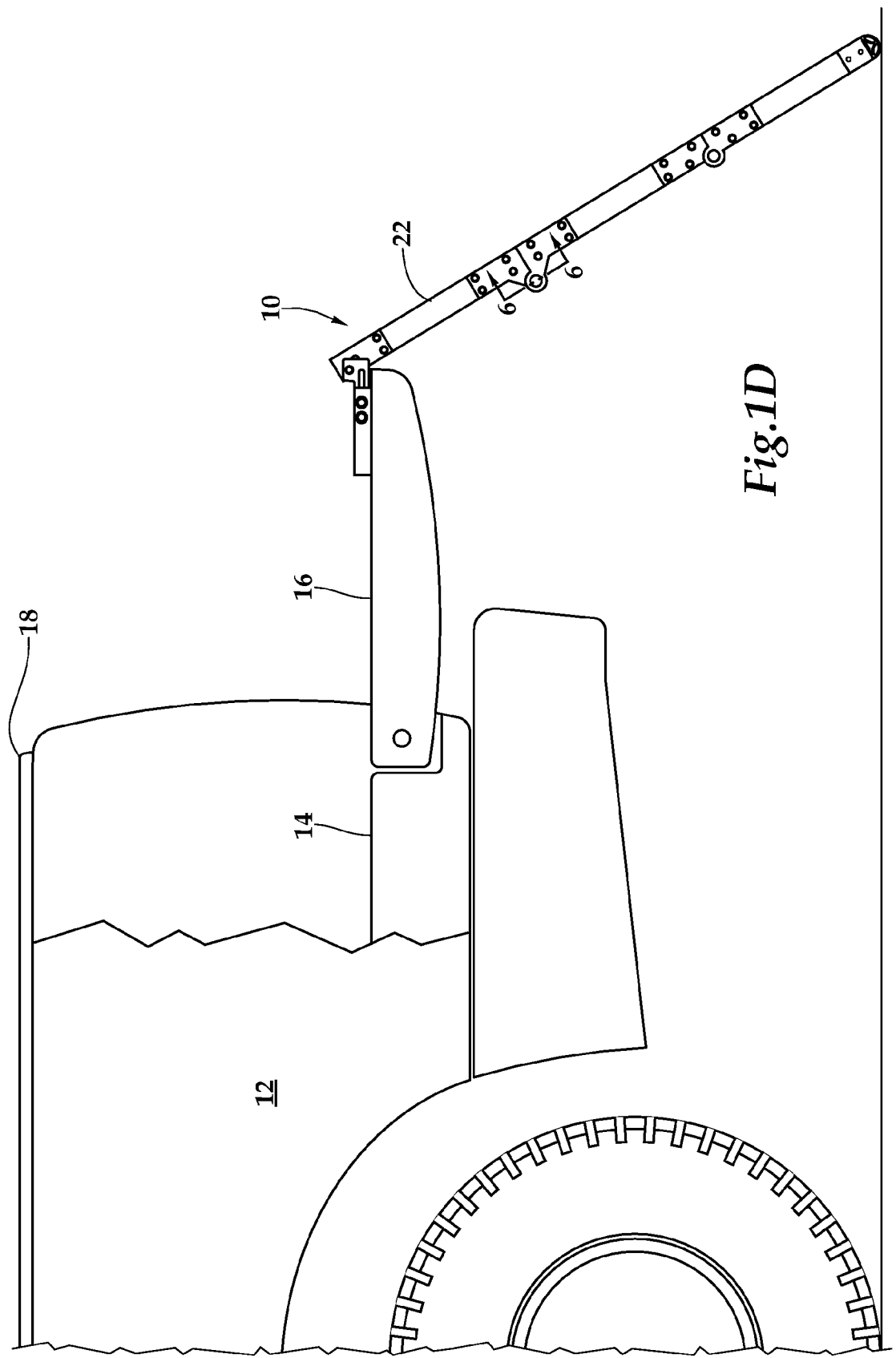
FIG. 1D is a side plan view, with partial cutaway, of the ladder assembly presented in FIG. 1A wherein the ladder assembly is positioned in the working configuration such that the ladder assembly extends from the tailgate to the ground.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Referring initially to FIGS. 1A through 1D, therein is depicted one embodiment of a ladder assembly 10 installed on a pickup truck 12 having a pickup truck bed 14, a tailgate 16 pivotally mounted thereto, and a pickup truck bed cover 18. Although a pickup truck 12 is illustrated, it should be appreciated that the ladder assembly 10 presented herein may be utilized with any type of vehicle or truck or other types of vehicles such as recreational vehicles (RVs) or campers, for example. In use, the ladder assembly 10 is mounted to the tailgate and positioned in a storage configuration 20 as depicted, for example, in FIG. 1A. The ladder assembly 10 may be positioned between the storage configuration wherein the ladder assembly 10 is folded and a working configuration wherein the ladder assembly 10 is extended.

To position the ladder assembly 10 from the storage configuration 20 to the working configuration 22, as depicted by arrow 24 and seen by comparing FIG. 1A to FIG. 1B, the tailgate 16 is opened. With reference to FIG. 1B, the ladder assembly 10 is then slid away from the pickup truck 12 as depicted by arrow 25 and pivotally rotated away from the tailgate 16 to an upright position as depicted by arrow 26. It should be appreciated that sliding and pivoting motions may occur substantially simultaneously or in a reverse order. Next, as depicted by arrows 30, 32, 34 in FIG. 1C, the ladder assembly 10 is unfolded and positioned in a working configuration 22, as depicted, for example, in FIG. 1D, wherein the ladder assembly 10 extends from the tailgate 16 to a ground surface. The working configuration 22 provides a plurality of walking steps for a person to easily get into and out of the pickup truck bed 14. Additionally, as previously discussed, the ladder assembly 10 clears the pickup truck bed cover 18 and, therefore, it is not necessary to remove the pickup truck bed cover 18 prior to utilizing the ladder assembly 10.

It should be appreciated that the ladder assembly 10 may be returned from the working configuration 22 to the storage configuration 20 using a substantially reverse methodology to that presented hereinabove in paragraph [0022]. In particular, the ladder assembly 10 in the working configuration 22 is lifted from the ground surface and folded upon itself as presented by comparing FIG. 1D to FIG. 1B. Then, the ladder assembly 10 is pivoted into contact with the tailgate 16 and slid forward. Finally, the tailgate 16 is closed to return the ladder assembly 10 to the storage configuration 20 illustrated in FIG. 1A.

As will be discussed in further detail hereinbelow, the ladder assembly 10 includes one pair of joints that is larger or displaced from the ladder assembly 10 with respect to the second pair of joints. With this arrangement, when an upper ladder section is folded into a middle ladder section a pocket is formed therebetween for receiving a lower ladder section. By folding the ladder sections in this manner, the ladder assembly 10 has a tight, compact form factor that permits the ladder assembly to clear the pickup truck bed cover 18 (or other type of covering) during use when the ladder assembly 10 is unfolded from the storage configuration 20 to the working configuration 22. Likewise, the ladder assembly 10 clears the pickup truck bed cover 18 (or other type of covering) when the ladder assembly 10 is repositioned and folded from the working configuration 22 to the storage configuration 20.

FIGS. 2A through 4 depict one embodiment of the ladder assembly 10 in further detail. In particular, the ladder assembly 10 presented in FIGS. 2A through 2D corresponds to the ladder assembly 10 presented in FIGS. 1A through 1D wherein one embodiment of the transition from a storage configuration 20 to a working configuration 22 is depicted. A base 36 is coupled to the tailgate. A pair of legs 38, 40 is slidably and pivotably mounted to the base 36. Each pair of legs 38, 40 includes three segments 42, 44, 46 that define an upper ladder section 48, a middle ladder section 50, and a lower ladder section 52. In the illustrated embodiment, the upper ladder section 48 includes one step 54, the middle ladder section 50 includes two steps 56, 58, and the lower ladder section 52 includes one step 60. Two ladder braces 62, 64 are coupled to the middle ladder section 50 to span from the step 56 to the legs 38, 40, respectively, of the segment 44. The ladder braces 62, 64 provide additional structural support and integrity to the ladder assembly 10. Similarly, the lower ladder section 52 includes two ladder braces 66, 68 spanning from the step 60 to the segment 46. It should be appreciated that the number and positioning of steps and ladder braces may vary from what is presented and described herein. Further, in a preferred embodiment, the surfaces of the steps 54-60 are comprised of a conventional non-slip surface. A pair of feet 70, 72 are coupled to the lower ladder segment 52 for contacting the ground.

A pair of joints 74, 76 of a first size hingedly couple the upper ladder section 48 to the middle ladder section 50. Similarly, a pair of joints 78, 80 of a second size hingedly couple the middle ladder section 50 to the lower ladder section 52. In one implementation, the pair of joints 74, 76 is larger than the pair of joints 78, 80. More particularly, the pair of joints 74, 76 is distally displaced by hinges with respect to the upper ladder section 48 and the middle ladder section 50 when the ladder assembly 10 is positioned in the working configuration 22. On the other hand, the pair of joints 78, 80 is substantially aligned with respect to the middle ladder section 50 and the lower ladder section 52 when the ladder assembly 10 is positioned in the working configuration 22.

In operation, when the ladder assembly 10 is positioned in the storage configuration 20, the upper ladder section 48 is folded into the middle ladder section 50 and a pocket 79 is formed therebetween for receiving the lower ladder section 52. Accordingly, in the storage configuration 20, from bottom to top, the ladder sections are positioned upper ladder section 48, lower ladder section 52, and middle ladder section 50. Additionally, it should be appreciated that various welds, rivets, such as rivet 81, and other fastening methods and fasteners may be utilized to join or couple the components of the ladder assembly 10 together. Further, once the ladder assembly 10 is in the folded configuration, straps with snaps or another fastening means may be employed to further secure the ladder assembly 10 in the storage configuration 20.

Figure 3:
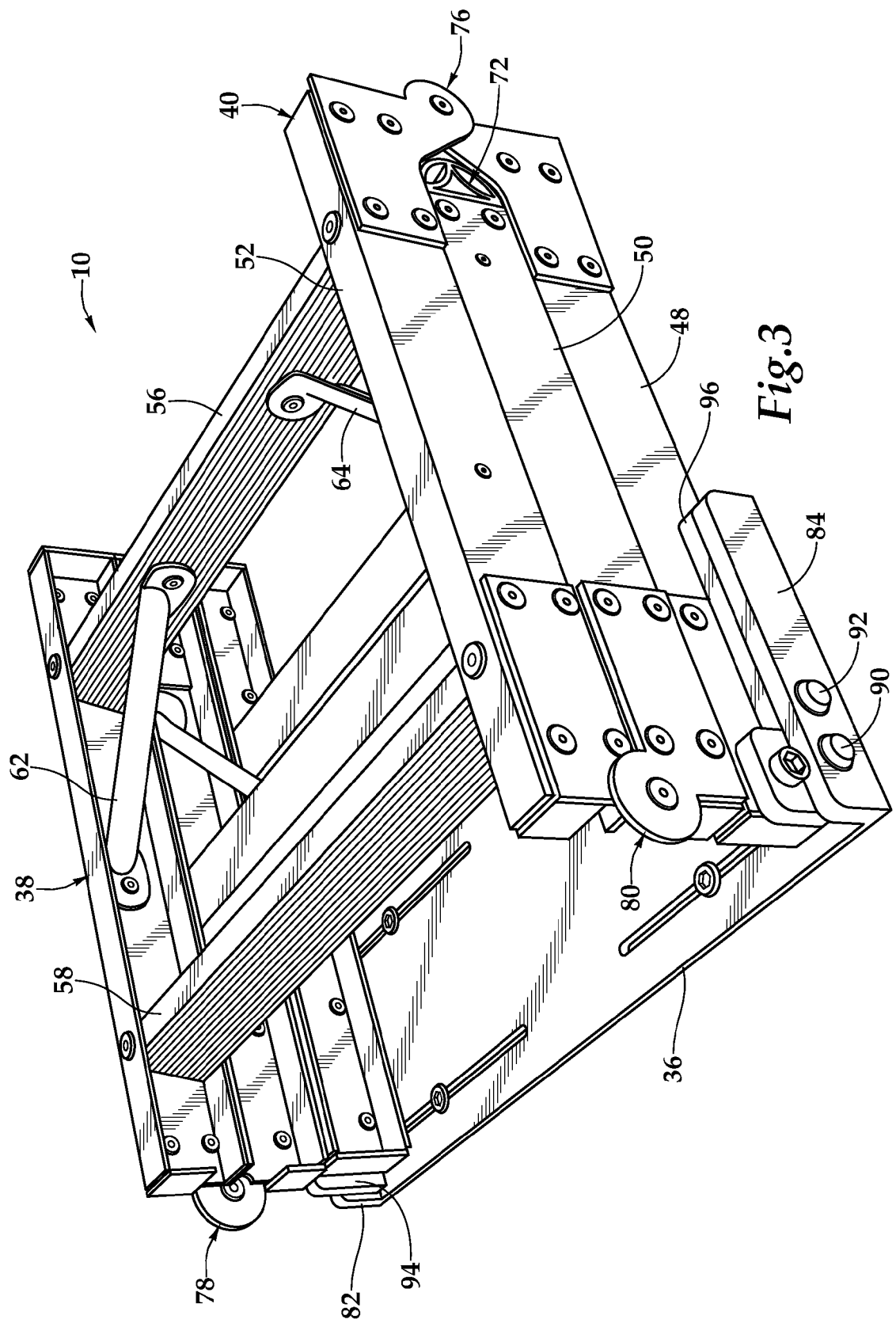
FIG. 3 a perspective view of one embodiment of the ladder assembly presented in FIG. 1A wherein the ladder assembly is positioned in a folded configuration.
Figure 4:
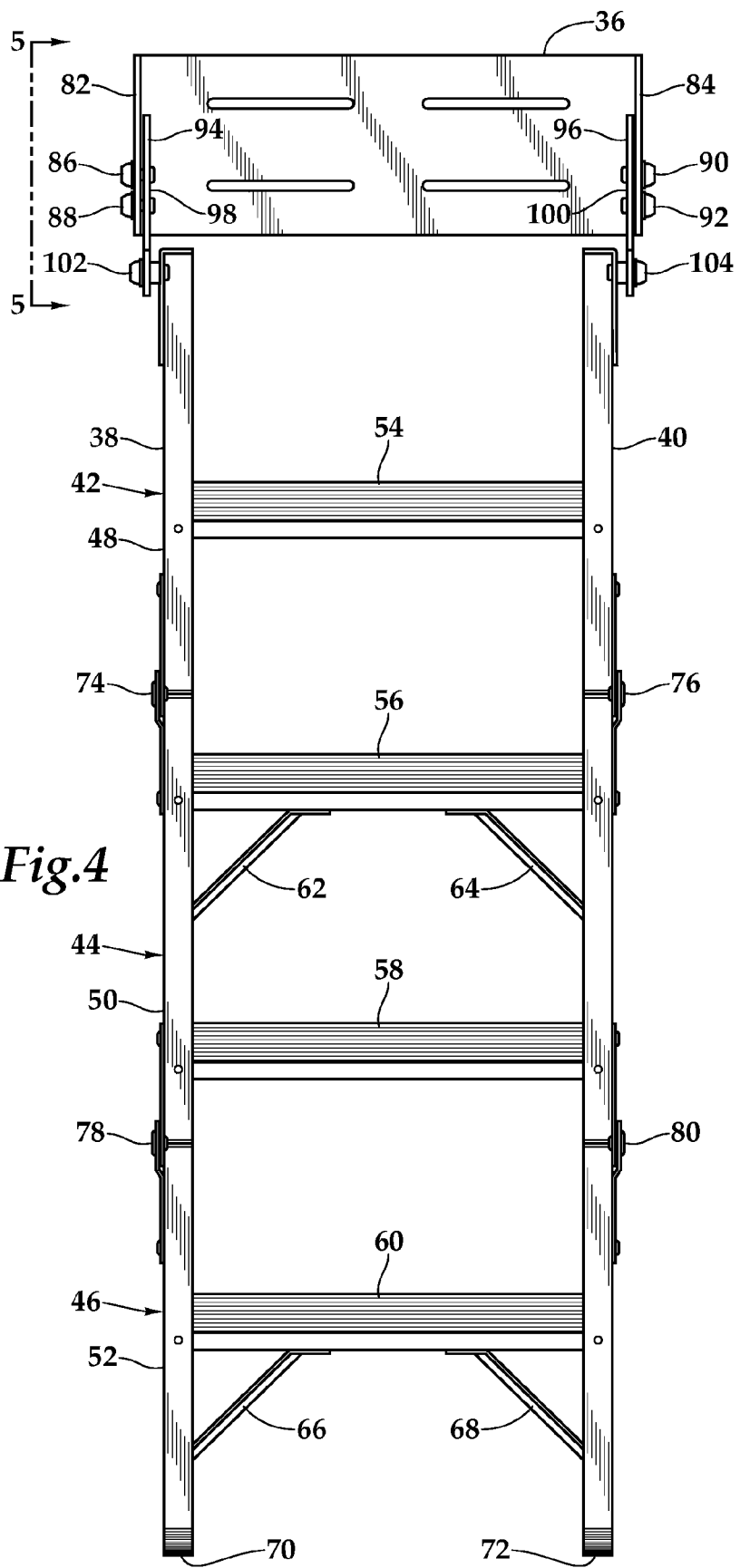
FIG. 4 is a top plan view of the ladder assembly presented in FIG. 1A in the working configuration.
Figure 5:
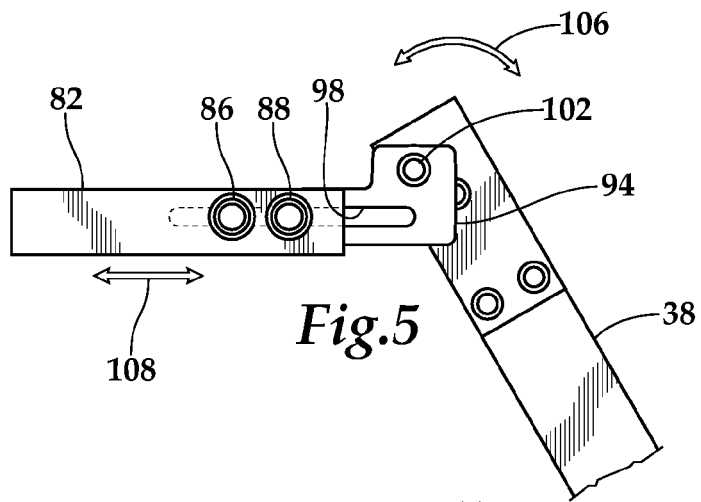
FIG. 5 is a side view taken along line 5-5 of FIG. 4 of portions of particular components of the ladder assembly; namely, a runner plate slidably mounted to a base.

Referring now to FIGS. 3 through 5, the base 36 may be coupled to the tailgate 16 by a mounting assembly that includes slots and rivets for securing the base 36 to the tailgate 16. Ribs 82, 84 are disposed at opposing ends of the base 36 and orthogonally to the base 36. The ribs 82, 84 each further comprise a pair of axle pins 86, 88 and 90, 92, respectively, that span the ribs 82, 84. The axle pins 86-92 may be held in place by cotter pins or pressed acorn caps, for example. Runner plates 94, 96 are slidably mounted to the ribs 82, 84, respectively. Each of the runner plates 94, 96 include respective slots 98, 100 that receive the respective axle pins 86-92 such that the first and second runner plates travel thereon orthogonally to the respective pairs of axle pins 86-92. Pins 102, 104 fasten the upper ladder second 48 to the runner plates 94, 96 such that the upper ladder section 48 pivots, as shown by double-headed arrow 106 (see FIG. 5), about the pins 102, 104 and slidably extends and retracts, as shown by double-headed arrow 108 (see FIG. 5), with respect to the stationary base 36.

Figure 6:
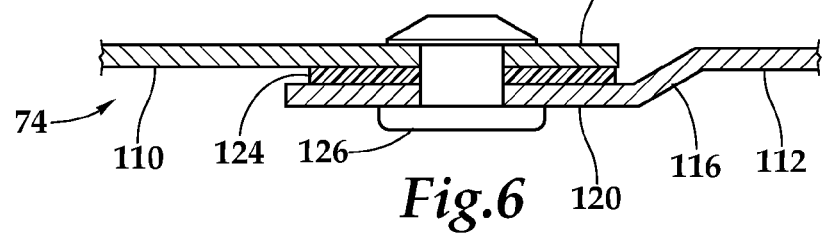
FIG. 6 is a cross section view taken along line 6-6 in FIG. 1D.
Figure 7:
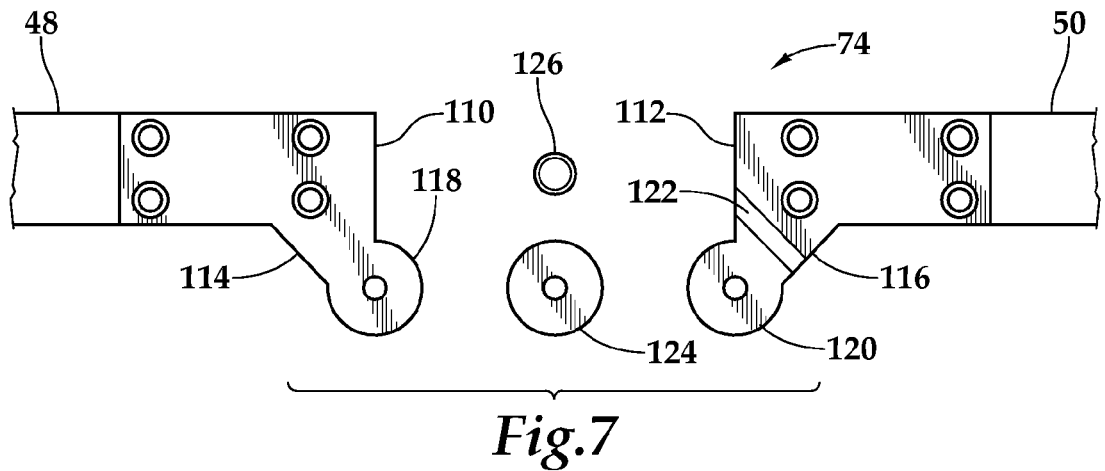
FIG. 7 is a side exploded view of one embodiment of a joint of the ladder assembly.

FIGS. 6 and 7 depict the joint 74 of the ladder assembly 10 in further detail. FIG. 6 illustrates a cross sectional view of the joint and FIG. 7 depicts a side exploded view of the joint 74 which includes a hinge member 110 that is coupled to the upper ladder section 48 and, likewise, a hinge member 112 that is coupled to the middle ladder section 50. The hinge members 110, 112 each include neck members 114, 116 and heads 118, 120, respectively. The hinge members 110, 112 are complimentary in that the neck member 116 includes a flanged portion 122 that permits the heads 118, 120 of the hinge members 110, 112 to coaxially align. Further, both the neck members 114, 116 of the hinge members 110, 112 distally extend from the upper ladder section 48 and middle ladder section 50 to create the displacement and an enlarged joint. A slip shim 124 is interposed between the heads of the hinge members and a rivet 126 secures together the head 120, the slip shim 124, and the head 118 to provide for pivot of the upper ladder section 48 and middle ladder section 50 about the rivet 126. The construction of the joint 76 is analogous to the construction of the joint 74.

Figure 8:
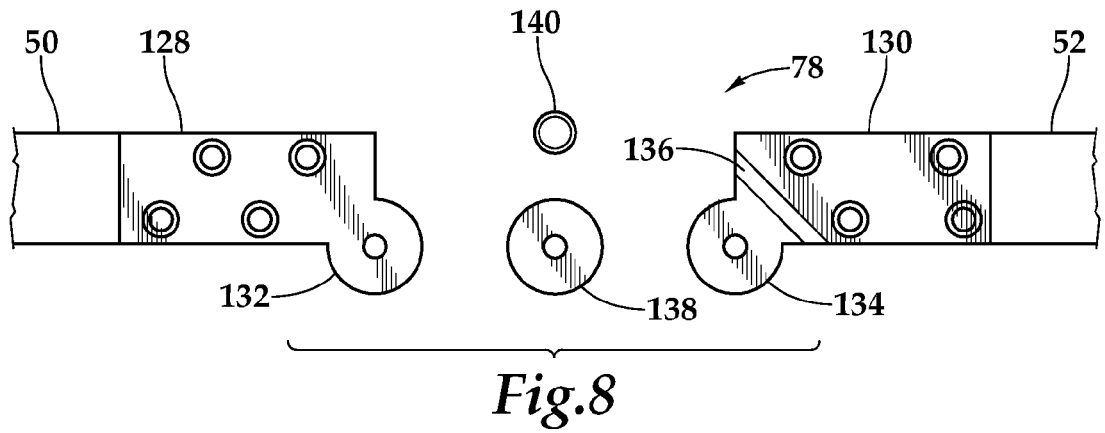
FIG. 8 is a side exploded view of one embodiment of another joint of the ladder assembly.

FIG. 8 depicts the joint 78 of the ladder assembly 10 in further detail. Hinge members 128, 130 are fastened to the middle and lower ladder sections 50, 52 and each of the hinge members 128, 130 include heads 132, 134, respectively. Further, the hinge member 130 includes a flange portion 136 that permits the hinge members 128, 130 to align during construction of the ladder assembly 10. A slip shim 138 is interposed between the heads 128, 130 and a rivet 140 is used to secure the joint 78. In the implementation presented, unlike the hinge members 110, 112, the hinge members 128, 130 do not include neck members to displace the joint. With this arrangement, the joints 74, 76 are major joints having the pocket 79 and the joints 78, 80 are minor joints without a pocket for receiving a ladder section. The construction of the joint 80 is analogous to the construction of the joint 78.

The materials for the components of the ladder assembly may vary depending on design and intended application (e.g., recreational or industrial). The components presented herein may comprise wood, metals, alloys, plastics, or composites thereof, depending on the application. By way of example, suitable materials for the upper, middle, and lower segments for an industrial application include 11 gauge hot-rolled, pickled and oiled steel with auto pheoretic coating, and 6063-T5 extruded aluminum. Suitable rivets and fasteners include black zinc steel shoulder rivets, truss head aluminum tubular rivets, 300 series stainless steel rivets and mandrels, and black 6/6 nylon ratchet fasteners, for example. By way of further example, suitable ship slims include natural nylon slip shims and suitable spacers include natural nylon spacers.

With respect to the above description then, it is to be realized that the optimum dimensional relationships for the components of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Further, while this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A ladder assembly for a tailgate of a truck, the ladder assembly comprising:
    a base operable to be coupled to the tailgate;
    first and second ribs disposed at opposing ends of the base;
    first and second runner plates slidably mounted to the first and second ribs, respectively, the first and second runner plates sliding, in a plane parallel to the base, beyond the first and second ribs in a working configuration;
    first and second pairs of axle pins spanning the first and second ribs, respectively;
    a pair of legs pivotably mounted to the first and second runner plates, each pair of legs including three segments defining an upper ladder section, a middle ladder section, and a lower ladder section, the pair of legs cooperating with the first and second runner plates to provide a range of motions including (i) the first and second runner plates sliding as the pair of legs pivot and (ii) the first and second runner plates sliding prior to the pair of legs pivoting;
    a first pair of joints of a first size for hingedly coupling the upper ladder section to the middle ladder section; and
    a second pair of joints of a second size for hingedly coupling the middle ladder section to the lower ladder section, the second size being smaller than the first size, wherein when the upper ladder section is folded into the middle ladder section, a pocket is formed therebetween for receiving the lower ladder section.

2. The ladder assembly as recited in claim 1, wherein each of the first pair of joints further comprise:
    a first hinge member integrally coupled to the upper ladder section;
    a second hinge member integrally coupled to the middle ladder section, the second hinge member being complimentary to the first hinge member;
    a slip shim interposed between the first hinge member and the second hinge member; and
    a rivet securing the second hinge member, the slip shim, and the first hinge member to provide for pivot of the upper ladder section and middle ladder section about the rivet.

3. The ladder assembly as recited in claim 1, wherein each of the second pair of joints further comprise:
    a first hinge member integrally coupled to the middle ladder section;
    a second hinge member integrally coupled to the lower ladder section, the second hinge member being complimentary to the first hinge member;
    a slip shim interposed between the first hinge member and the second hinge member; and
    a rivet securing the first hinge member, the slip shim, and the second hinge member to provide for pivot of the middle ladder section and lower ladder section about the rivet.

4. The ladder assembly as recited in claim 1, wherein the upper ladder section, middle ladder section, and lower ladder section comprise hot-rolled, pickled and oiled steel.

5. The ladder assembly as recited in claim 1, wherein the upper ladder section further comprises one step.

6. The ladder assembly as recited in claim 1, wherein the middle ladder section further comprises two steps.

7. The ladder assembly as recited in claim 1, wherein the lower ladder section further comprises one step.

8. The ladder assembly as recited in claim 1, wherein the middle ladder section further comprises two ladder braces spanning from a step to the segment.

9. The ladder assembly as recited in claim 1, wherein the lower ladder section further comprises two ladder braces spanning from a step to the segment.

10. The ladder assembly as recited in claim 1, wherein the lower ladder section further comprises a pair of feet coupled thereto for contacting the ground.

11. The ladder assembly as recited in claim 1, wherein the base is coupled to the tailgate by a mounting assembly that includes rivets for securing the base to the tailgate.

12. The ladder assembly as recited in claim 1, wherein the first and second pairs of axle pins comprise axle bearings.

13. The ladder assembly as recited in claim 12, wherein the first and second runner plates each further comprise respective slots that receive the respective pairs of axle bearings such that the first and second runner plates travel thereon orthogonally to the respective pairs of axle bearings.

14. A ladder assembly for a tailgate of a truck, the ladder assembly comprising:
    a base operable to be coupled to the tailgate;
    first and second ribs disposed at opposing ends of the base;
    first and second runner plates slidably mounted to the first and second ribs, respectively, the first and second runner plates sliding, in a plane parallel to the base, beyond the first and second ribs in a working configuration;
    first and second pairs of axle pins spanning the first and second ribs, respectively;
    a pair of legs pivotably mounted to the first and second runner plates, each pair of legs including three segments defining an upper ladder section, a middle ladder section, and a lower ladder section, the pair of legs cooperating with the first and second runner plates to provide a range of motions including (i) the first and second runner plates sliding as the pair of legs pivot and (ii) the first and second runner plates sliding prior to the pair of legs pivoting;

a first pair of joints for hingedly coupling the upper ladder section to the middle ladder section, the first pair of joints being substantially distally displaced with respect to the upper ladder section and the middle ladder section when the ladder assembly is positioned in a working configuration; and a second pair of joints for hingedly coupling the middle ladder section to the lower ladder section, the second pair of joints being aligned with the middle ladder section and the lower ladder section when the ladder assembly is positioned in the working configuration, wherein when the upper ladder section is folded into the middle ladder section, a pocket is formed therebetween for receiving the lower ladder section.

15. The ladder assembly as recited in claim 14, wherein each of the first pair of joints further comprise:

a first hinge member integrally coupled to the upper ladder section;

a second hinge member integrally coupled to the middle ladder section, the second hinge member being complimentary to the first hinge member;

a slip shim interposed between the first hinge member and the second hinge member; and a rivet securing the second hinge member, the slip shim, and the first hinge member to provide for pivot of the upper ladder section and middle ladder section about the rivet.

16. The ladder assembly as recited in claim 15, wherein the first hinge member and the second hinge member respectively distally extend from the upper ladder section and middle ladder section.

17. The ladder assembly as recited in claim 14, wherein each of the second pair of joints further comprise:

a first hinge member integrally coupled to the middle ladder section;

a second hinge member integrally coupled to the lower ladder section, the second hinge member being complimentary to the first hinge member;

a slip shim interposed between the first hinge member and the second hinge member; and a rivet securing the first hinge member, the slip shim, and the second hinge member to provide for pivot of the middle ladder section and lower ladder section about the rivet.

\* \* \* \* \*